United States Patent
Benet Rajkumar et al.

(10) Patent No.: US 12,544,739 B2
(45) Date of Patent: Feb. 10, 2026

(54) METHOD FOR MANUFACTURING GASOLINE PARTICULATE FILTER

(71) Applicant: JOHNSON MATTHEY PUBLIC LIMITED COMPANY, London (GB)

(72) Inventors: Brenda Benet Rajkumar, Royston (GB); Ketan Chavda, Royston (GB); Lucy Clowes, Royston (GB); Olivia Dunseath, Reading (GB); Mark Walton, Royston (GB)

(73) Assignee: Johnson Matthey Public Limited Company, London (GB)

( * ) Notice: Subject to any disclaimer, the term of this patent is extended or adjusted under 35 U.S.C. 154(b) by 476 days.

(21) Appl. No.: 18/321,390

(22) Filed: May 22, 2023

(65) Prior Publication Data

US 2023/0381746 A1 Nov. 30, 2023

Related U.S. Application Data

(60) Provisional application No. 63/365,436, filed on May 27, 2022.

(51) Int. Cl.
 *B01J 23/46* (2006.01)
 *B01D 53/94* (2006.01)
 (Continued)

(52) U.S. Cl.
 CPC ............ *B01J 23/464* (2013.01); *B01D 53/94* (2013.01); *B01J 21/04* (2013.01); *B01J 23/10* (2013.01); *B01J 35/56* (2024.01); *B01J 37/0018* (2013.01); *B01J 37/0219* (2013.01); *B01J 37/088* (2013.01); *B01D 2255/1021* (2013.01); *B01D 2255/1023* (2013.01); *B01D 2255/1025* (2013.01); *B01D 2255/707* (2013.01); *B01D 2255/908* (2013.01); *B01D 2255/9155* (2013.01); *B01D 2258/01* (2013.01); *B01D 2259/4566* (2013.01); *B01J 35/40* (2024.01); *B01J 2235/30* (2024.01)

(58) Field of Classification Search
 CPC . B01J 23/464; B01J 35/56; B01J 21/04; B01J 23/10; B01D 53/94
 See application file for complete search history.

(56) References Cited

U.S. PATENT DOCUMENTS 10,570,063 B1 * 2/2020 Wiseman .................. B28B 1/14
10,625,243 B2 4/2020 Clowes
(Continued)

FOREIGN PATENT DOCUMENTS

GB 2524662 A 9/2015
WO 9947260 A1 9/1999
(Continued)

*Primary Examiner* — Nathan T Leong

(57) ABSTRACT

A method for the manufacture of a gasoline particulate filter (GPF) for the treatment of an exhaust gas is disclosed. The method comprises (i) forming a washcoat slurry; (ii) coating a wall-flow filter substrate with the washcoat slurry to form a washcoated substrate; and (iii) calcining the washcoated substrate to form a gasoline particulate filter. The washcoat slurry comprises (a) a platinum group metal selected from the group consisting of Pt, Pd, Rh and mixtures thereof; (b) an oxygen storage capacity (OSC) material; and (c) a $C_2$-$C_6$ aliphatic amino acid.

20 Claims, 3 Drawing Sheets

(51) Int. Cl.
*B01J 21/04* (2006.01)
*B01J 23/10* (2006.01)
*B01J 35/56* (2024.01)
*B01J 37/00* (2006.01)
*B01J 37/02* (2006.01)
*B01J 37/08* (2006.01)
*B01J 35/40* (2024.01)

(56) References Cited

U.S. PATENT DOCUMENTS

| | | |
|---|---|---|
| 2009/0193796 A1 | 8/2009 | Wei et al. |
| 2010/0111789 A1 | 5/2010 | Fajardie et al. |
| 2017/0304810 A1 | 10/2017 | Bernadini et al. |
| 2018/0298800 A1* | 10/2018 | Clowes ............... F01N 3/2013 |
| 2018/0369787 A1 | 12/2018 | Khader |
| 2020/0306692 A1* | 10/2020 | Goodwin ............... F01N 3/021 |

FOREIGN PATENT DOCUMENTS

| | | |
|---|---|---|
| WO | 2013046150 A1 | 4/2013 |
| WO | 2017056067 A1 | 4/2017 |
| WO | 2017178801 A1 | 10/2017 |
| WO | 2020201953 A1 | 10/2020 |

\* cited by examiner

METHOD FOR MANUFACTURING GASOLINE PARTICULATE FILTER

FIELD OF THE INVENTION

The present invention relates to a method of providing a catalytic wall-flow filter suitable for use in an emission treatment system, in particular an emission treatment system for a positive ignition internal combustion engine, such as a gasoline spark ignition engine. The present invention provides a method for manufacturing a gasoline particulate filter with improved catalytic activity and reduced back pressure.

BACKGROUND OF THE INVENTION

Gasoline particulate filters (GPF) are an emission aftertreatment technology based on diesel particulate filters (DPF), developed to control particulate emissions from gasoline direct injection (GDI) engines.

Most early GPF applications included an uncoated GPF positioned downstream of a three-way catalyst (TWC). As the technology matured, GPFs have been also coated with a three-way catalyst. This catalyst-coated GPF configuration is sometimes referred to as a four-way catalyst. However, the combination of the catalyst coating on a filter body does introduce additional issues such as undue back-pressure, and there are requirements for minimum CO, $NO_x$ and HC conversion properties.

WO2017056067A1 discloses a catalytic wall-flow monolith filter having three-way catalytic activity for use in an emission treatment system of a positive ignition internal combustion engine. This is characterised by either having an amount by weight of platinum group metal, per unit volume of the on-wall coating present on channel wall surfaces which varies continually along the longitudinal direction or varying the wall thickness.

WO2020201953A1 discloses a catalyst article for treating exhaust gas emissions from gasoline engines, in particular to a wall-flow filter suitable for treating fine particulate emissions having a size of less than 23 nm. This is achieved by the use of a specific particulate oxygen storage component having controlled particle size.

U.S. Pat. No. 10,570,063B1 discloses the use of beta-alanine as a dispersant in the manufacture of a nano-suspension mixed oxides. There is no suggestion in U.S. Pat. No. 10,570,063B1 that these may be desirably used in exhaust gas treatment applications.

WO2017178801A1 discloses a method of coating a substrate with a foam. The method comprises: (a) introducing a foam into a substrate comprising a plurality of channels through open ends of the channels at a first end of the substrate; and (b) optionally applying (i) a vacuum to open ends of the channels at a second end of the substrate and/or (ii) a pressure to the open ends of the channels at the first end of the substrate; wherein the foam comprises a particulate material, and wherein the foam is particle stabilized.

It is an object of the present invention to provide an improved method for the manufacture of a GPF, to tackle problems associated with the prior art.

SUMMARY OF THE INVENTION

The present invention is a method for the manufacture of a gasoline particulate filter (GPF) for the treatment of an exhaust gas, the method comprising:
(i) forming a washcoat slurry;
(ii) coating a wall-flow filter substrate with the washcoat slurry to form a washcoated substrate; and
(iii) calcining the washcoated substrate to form a GPF;
wherein the washcoat slurry comprises (a) a platinum group metal selected from the group consisting of Pt, Pd, Rh, and mixtures thereof; (b) an oxygen storage capacity (OSC) material; and (c) a $C_2$-$C_6$ aliphatic amino acid.

DETAILED DESCRIPTION OF THE INVENTION

Figure 1:
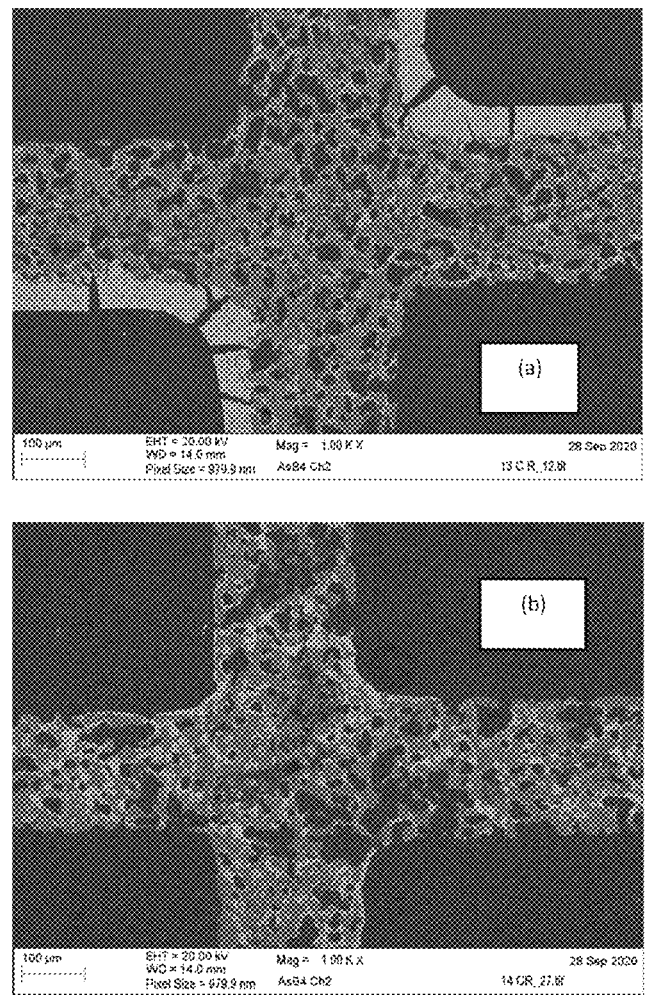
FIG. 1 shows the SEM images of the front-middle section of GPF-A (top) and GPF-B (bottom).

The present disclosure will now be described further. In the following passages, different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present invention is a method for the manufacture of a gasoline particulate filter (GPF) for the treatment of an exhaust gas, the method comprising:
(i) forming a washcoat slurry;
(ii) coating a wall-flow filter substrate with the washcoat slurry to form a washcoated substrate; and
(iii) calcining the washcoated substrate to form a gasoline particulate filter;
wherein the washcoat slurry comprises (a) a platinum group metal selected from the group consisting of Pt, Pd, Rh and mixtures thereof; (b) an oxygen storage capacity (OSC) material; and (c) a $C_2$-$C_6$ aliphatic amino acid.

Accordingly, within the scope of the present invention, a gasoline particulate filter refers to a catalyst-coated wall-flow filter substrate.

The wall-flow filter substrate typically has a first face and a second face defining a longitudinal direction therebetween and first and second pluralities of channels extending in the longitudinal direction, the first plurality of channels is open at the first face and closed at the second face and the channels of the first plurality of channels are defined in part by channel wall surfaces. The second plurality of channels is open at the second face and closed at the first face and the channels of the second plurality of channels are defined in part by channel wall surfaces. The channel walls between the channel wall surfaces of the first plurality of channels and the channel wall surfaces of the second plurality of channels are porous.

The wall-flow filter substrate can be a ceramic porous substrate, such as cordierite, aluminium titanate, silicon carbide, and the like. The filter substrate may have a porosity of 40 to 75%, such as 45 to 70% or 50 to 60%.

The method comprises forming a washcoat slurry. The washcoat slurry comprises a solvent. Water is a preferred solvent for the washcoat slurry.

The washcoat slurry comprises a platinum group metal (PGM) selected from the group consisting of Pt, Pd, Rh, and mixtures thereof. Preferably the washcoat slurry comprises Pt and Rh, or, Pd and Rh. For example, the washcoat slurry may comprise Pt and Rh. Alternatively, the washcoat slurry may comprise Pd and Rh. The amount of the total PGM in the washcoat slurry can be from 0.005 to 10 wt %, preferably from 0.001 to 5 wt %, more preferably from 0.05 to 3.0 wt %, relative to the total weight of the washcoat slurry.

The washcoat slurry comprises an oxygen storage capacity (OSC) material. "Oxygen storage capacity" refers to the ability of materials used as oxygen storage capacity material in catalysts to store oxygen at lean conditions and to release it at rich conditions.

The OSC material can be ceria or a mixed oxide comprising ceria. Preferably the OSC material comprises a mixed oxide of cerium and zirconium; a mixed oxide of cerium, zirconium, and aluminium; a mixed oxide of cerium, zirconium, and neodymium; or a mixed oxide of cerium, zirconium and praseodymium. The term "mixed oxide" as used herein generally refers to a mixture of oxides in a single phase, as is conventionally known in the art. In one embodiment, the OSC material comprises a cerium-zirconium mixed oxide nano sol with a mean particle size of less than 1 μm. In another embodiment, the OSC material comprises a cerium-zirconium mixed oxide with a mean particle size of from 1 to 20 μm, preferably from 2 to 15 μm, more preferably from 5 to 10 μm.

The amount of the OSC material in the washcoat slurry can be from 5 to 50 wt %, preferably from 10 to 30 wt %, relative to the total weight of the washcoat slurry.

The washcoat slurry comprises a $C_2$-$C_6$ aliphatic amino acid. Suitable $C_2$-$C_6$ aliphatic amino acids include 3-amino-propionic acid, L-alanine, glycine, serine, L-valine, and the like. Preferably the $C_2$-$C_6$ aliphatic amino acid is an amino acid having the formula $HO_2C-(CH_2)_n-NH_2$, wherein n is from 1-5, preferably from 1 to 3. One preferred amino acid is 3-amino-propionic acid (n=2).

The amount of the $C_2$-$C_6$ aliphatic amino acid in the washcoat slurry can be from 1 to 50% wt %, preferably from 2 to 40 wt %, more preferably from 5 to 30 wt %, relative to the crucible solids in the washcoat slurry.

The washcoat slurry may further comprise an inorganic oxide support. The inorganic oxide support can be an oxide of Groups 2, 3, 4, 5, 13 and 14 elements. The inorganic oxide support is preferably a refractory oxide that exhibits chemical and physical stability at high temperatures, such as the temperatures associated with gasoline engine exhaust. The inorganic oxide support can be selected from the group consisting of alumina, silica, titania, and mixed oxides or composite oxides thereof. More preferably, the inorganic oxide support is an alumina. In one embodiment, the inorganic oxide support is gamma-alumina. The gamma-alumina used as the inorganic oxide support preferably has a mean particle size of from 1 to 10 μm, more preferably from 2 to 8 μm. In another embodiment, the inorganic oxide support is a nano alumina. The nano alumina used as the inorganic oxide support preferably has a mean particle size of less than 1 μm.

The inorganic oxide support can be doped with a dopant. The dopant can be selected from the group consisting of La, Sr, Si, Ba, Y, Pr, Nd, Ce, and mixtures thereof. Preferably, the dopant is La, Ba, or Ce. Most preferably, the dopant is La. The dopant content in the inorganic oxide support can be from 1 to 30 wt %, preferably from 2 to 25 wt %, more preferably from 3 to 20 wt %.

The amount of the inorganic oxide support in the washcoat slurry can be from 2 to 30 wt %, preferably from 5 to 20 wt %, relative to the total weight of the washcoat slurry.

The washcoat slurry typically has a solid content of from 15 to 40 wt %, more preferably 20 to 35 wt %.

The method comprises coating a wall-flow filter substrate with the washcoat slurry to form a washcoated substrate. Coating may be performed by spraying and/or dipping the wall-flow filter substrate. Preferably the coating is applied to at least one of the inlet channels and the outlet channels of the wall-flow filter substrate. More preferably the coating is applied to both the inlet and the outlet channels. One suitable coating procedure is described in GB2524662A.

The method further comprises calcining the washcoated substrate to form a GPF. Calcining may be preceded by a drying step at a lower temperature (such as 80 to 200° C.). Calcining is routine in the art and may be performed under usual conditions.

After the calcination, the PGM loading in the GPF is generally from 1 g/ft$^3$ to 50 g/ft$^3$, more preferably 5 g/ft$^3$ to 40 g/ft$^3$. The washcoat loading of the GPF, after calcination, is typically from 0.2 g/in$^3$ to 5 g/in$^3$, more preferably 0.5 g/in$^3$ to 3 g/in$^3$ The inventors have found that the inclusion of the $C_2$-$C_6$ aliphatic amino acid lowers the viscosity of the washcoat slurry. As a consequence, the washcoat slurry is able to penetrate the pores of the substrate more deeply, which has been found to reduce back-pressure. In addition, the inclusion of the $C_2$-$C_6$ aliphatic amino acid improves the catalytic performance of the GPF.

Example 1

GPF Preparation

Washcoat Slurry A-1

A washcoat slurry A-1 containing Pd nitrate, Rh nitrate, a cerium-zirconium mixed oxide nano sol (mean particle size 390 nm), a gamma phase alumina (mean particle size 5 μm), and water was prepared. The slurry had a solid content of 25% and a viscosity of >500 cP, as measured at 20° C. on Brookfiled™ RV DVII+ Extra Pro viscometer using a SC4-27 spindle at 50 rpm spindle speed.

GPF-A (Comparative Example)

Washcoat slurry A-1 prepared above was coated from both the inlet and outlet face of a cordierite wall-flow honeycomb filter substrate (300 cells per square inch; mean pore size 17 μm; porosity 66%) using a coating procedure described in GB2524662. A pre-determined amount of the slurry was deposited at an upper end of the filter substrate using a slurry dosing head. The dosing head had a plurality of apertures arranged to dispense the slurry onto the upper end face of the filter substrate. The channels having open ends at the upper end of the filter substrate were coated with the pre-determined amount of the slurry by applying a vacuum to a lower end of the filter substrate to draw the slurry along the channels. The coating length on the inlet channels is about 30% of the substrate length. The coating length on the outlet channels is about 70% of the substrate length. The coated substrate was dried at 110° C., and calcined at 500° C. to produce the GPF. The GPF thus produced has a washcoat loading of 1.64 g/in$^3$, Pd loading of 35 g/ft$^3$, and Rh loading of 10 g/ft$^3$.

The SEM image of the front-middle section of GPF-A shows that significant amount of the washcoat is on-wall, as shown in FIG. 1(a).

Washcoat Slurry B-1

Washcoat slurry B-1 containing Pd nitrate, Rh nitrate, a mixed ceria-zirconia based mixed oxide (mean particle size 7 μm), nano-alumina boehmite (mean particle size 70-120 nm), and water was prepared. The washcoat slurry has a solid content of 30%. The slurry had a viscosity of >3000 cP, as measured at 20° C. on Brookfiled™ RV DVII+ Extra Pro viscometer using a SC4-27 spindle at 50 rpm spindle speed.

Washcoat Slurry B-2

Washcoat slurry B-2 containing Pd nitrate, Rh nitrate, a mixed ceria-zirconia based mixed oxide composite (mean particle size 7 μm), a nano-alumina boehmite (mean particle size 70-120 nm), 3-aminopropanoic acid, and water was prepared. The amount of the 3-aminopropanoic acid is 40 wt % with respect to crucible solid in the washcoat slurry. The washcoat slurry B-2 has a solid content of 30%. The slurry had a viscosity of <50 cP, as measured at 20° C. on Brookfiled™ RV DVII+ Extra Pro viscometer using a SC4-27 spindle at 50 rpm spindle speed. The inclusion of 3-aminopropanoic acid significantly reduced the viscosity of the slurry.

GPF-B

GPF-B was prepared by following the same procedure as for preparing GPF-A, except that the washcoat slurry B-2 was used. The GPF-B thus produced has a washcoat loading of 1.64 g/in$^3$, Pd loading of 35 g/ft$^3$, and Rh loading of 10 g/ft$^3$.

The SEM image of the front-middle section of GPF-B showed that the washcoat was primarily in-wall, as shown in FIG. 1(b).

GPF-C

GPF-C was prepared in the similar manner as GPF B, except that the amount of the 3-aminopropanoic acid is 6 wt % with respect to crucible solids in the washcoat slurry. The washcoat slurry had a viscosity of <100 cP, as measured at 20° C. on Brookfiled™ RV DVII+Extra Pro viscometer using a SC4-27 spindle at 50 rpm spindle speed. The GPF-C thus produced had a washcoat loading of 1.64 g/in$^3$, Pd loading of 35 g/ft$^3$, and Rh loading of 10 g/ft$^3$.

Example 2

Cold Flow Back Pressure Testing

The cold flow back pressure (BP) of the fresh GPF-C and fresh GPF-A (comparative example) are shown in Table 1. The data show that cold flow backpressure is reduced when the amount of 3-aminopropanoic acid used is 6 wt % of the crucible solid in the washcoat slurry.

TABLE 1

Cold Flow Back Pressure Test

| | Back Pressure (mbar) @ 600 m$^3$/h |
|---|---|
| GPF-A (comparative) | 65.1 |
| GPF-C | 64.4 |

Example 3

Performance Test

Figure 2:
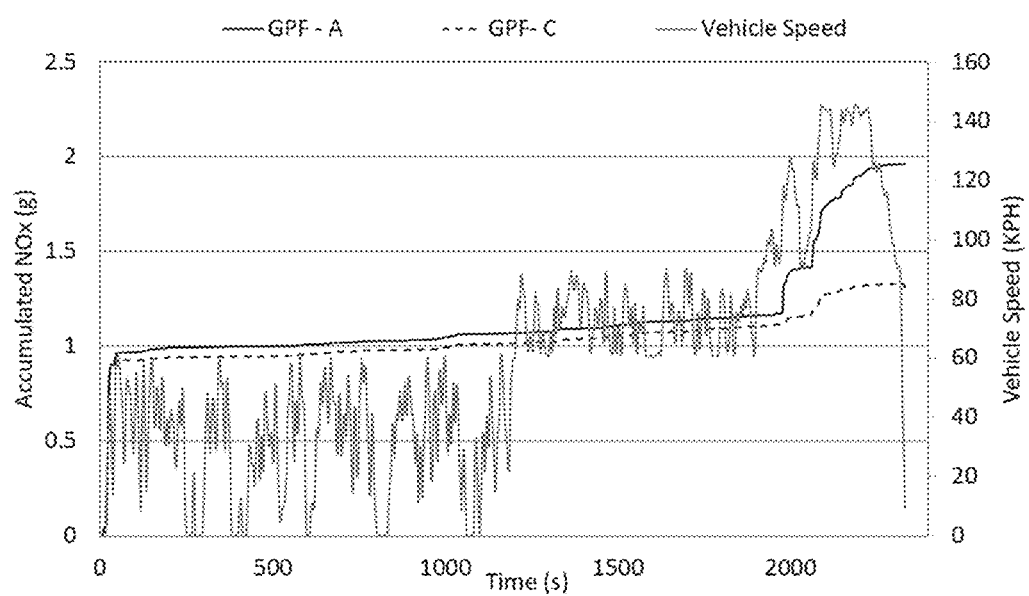
FIG. 2 shows the accumulated $NO_x$ during a JLR RDE drive cycle of hydrothermally aged GPF-A as compared to that of hydrothermally aged GPF-C. The solid line correlates to GPF-A. The dashed line correlates to GPF-C. The grey line correlates to the vehicle speed.
Figure 3:
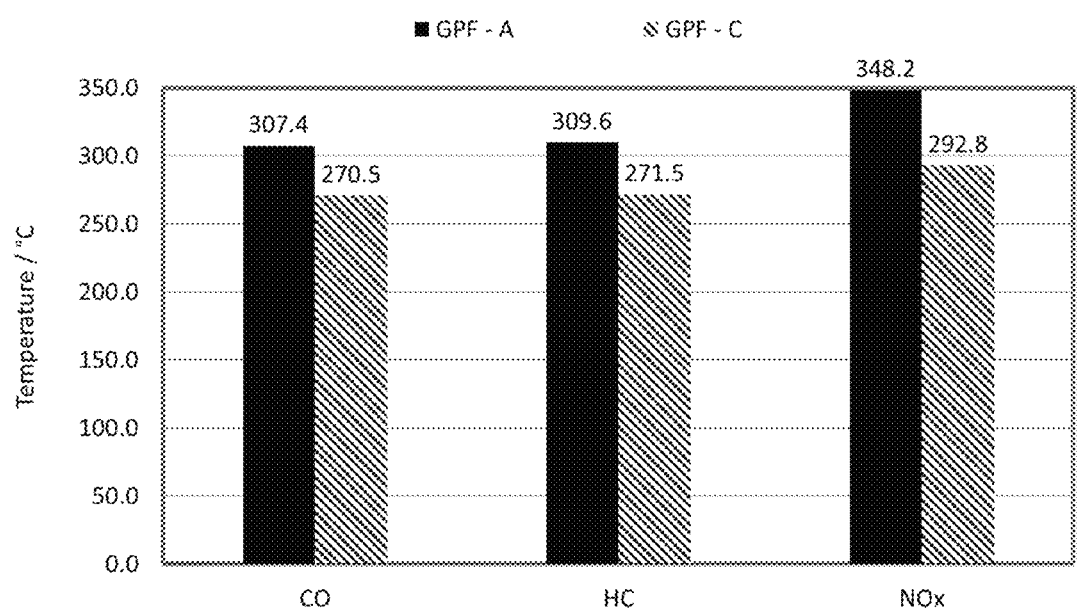
FIG. 3 shows the CO, THC (total hydrocarbon) and $NO_x$ T50 light-off temperatures. The dark bar correlates to GPF-A. The dashed bar correlates to GPF-C.

GPF-C and GPF-A were hydrothermally aged under lean conditions. They were then evaluated on an engine for three-way performance by the JLR RDE drive cycle evaluation. A 53% reduction in the total NOx across the GPF-C was measured as compared to a 34% reduction in the total NOx across the GPF-A, as shown in FIG. 2. Furthermore, GPF-C gave a 40-50° C. light-off benefit in the NOx, CO, and THC T50 when compared to GPF-A, as shown in FIG. 3.

The invention claimed is:

1. A method for the manufacture of a gasoline particulate filter (GPF) for the treatment of an exhaust gas, the method comprising:
   (i) forming a washcoat slurry;
   (ii) coating a wall-flow filter substrate with the washcoat slurry to form a washcoated substrate; and
   (iii) calcining the washcoated substrate to form a gasoline particulate filter;
   wherein the washcoat slurry comprises (a) a platinum group metal selected from the group consisting of Pt, Pd, Rh and mixtures thereof; (b) an oxygen storage capacity (OSC) material; and (c) a $C_2$-$C_6$ aliphatic amino acid.

2. The method of claim 1, wherein the $C_2$-$C_6$ aliphatic amino acid has the formula $HO_2C$—$(CH_2)_n$—$NH_2$, wherein n is from 1 to 5.

3. The method of claim 2, wherein n is from 1 to 3.

4. The method of claim 2, wherein n is 2.

5. The method of claim 4, wherein the amount of the $C_2$-$C_6$ aliphatic amino acid in the 30 washcoat slurry is from 1 to 50% wt % relative to the crucible solids in the washcoat slurry.

6. The method of claim 4, wherein the amount of the $C_2$-$C_6$ aliphatic amino acid in the washcoat slurry is from 2 to 40 wt % relative to the crucible solids in the washcoat slurry.

7. The method of claim 4, wherein the amount of the $C_2$-$C_6$ aliphatic amino acid in the washcoat slurry is from 5 to 30 wt % relative to the crucible solids in the washcoat slurry.

8. The method of claim 4,
   wherein the amount of the $C_2$-$C_6$ aliphatic amino acid in the washcoat slurry is from 5 to 30 wt % relative to the crucible solids in the washcoat slurry;
   wherein the OSC material comprises a cerium-zirconium mixed oxide nano sol with a mean particle size of less than 1 μm; and
   wherein the inorganic oxide support is a gamma-alumina having a mean particle size of from 1 to 10 μm.

9. The method of claim 4,
   wherein the amount of the $C_2$-$C_6$ aliphatic amino acid in the washcoat slurry is from 5 to 30 wt % relative to the crucible solids in the washcoat slurry;
   wherein the OSC material comprises a cerium-zirconium mixed oxide nano sol with a mean particle size of less than 1 μm;
   wherein the inorganic oxide support is a gamma-alumina having a mean particle size of from 2 to 8 μm.

10. The method of claim 4,
    wherein the amount of the $C_2$-$C_6$ aliphatic amino acid in the washcoat slurry is from 5 to 30 wt % relative to the crucible solids in the washcoat slurry;
    wherein the OSC material comprises a cerium-zirconium mixed oxide with a mean particle size of from 5 to 10 μm; and
    wherein the inorganic oxide support is a nano alumina with a mean particle size of less than 1 μm.

11. The method of claim 1, wherein the amount of the $C_2$-$C_6$ aliphatic amino acid in the washcoat slurry is from 1 to 50% wt % relative to the crucible solids in the washcoat slurry.

12. The method of claim 1, wherein the amount of the $C_2$-$C_6$ aliphatic amino acid in the washcoat slurry is from 2 to 40 wt % relative to the crucible solids in the washcoat slurry.

13. The method of claim 1, wherein the amount of the $C_2$-$C_6$ aliphatic amino acid in the washcoat slurry is from 5 to 30 wt % relative to the crucible solids in the washcoat slurry.

14. The method of claim 1, wherein the washcoat slurry comprises Pt and Rh.

15. The method of claim 1, wherein the washcoat slurry comprises Pd and Rh.

16. The method of claim 1, wherein the OSC material comprises a mixed oxide of cerium and zirconium; a mixed oxide of cerium, zirconium, and aluminium; a mixed oxide of cerium, zirconium, and neodymium; or a mixed oxide of cerium, zirconium and praseodymium.

17. The method of claim 1, wherein the OSC material comprises a cerium-zirconium mixed oxide nano sol with a mean particle size of less than 1 μm.

18. The method of claim 1, wherein the washcoat slurry further comprises an inorganic oxide support.

19. The method of claim 18, wherein the inorganic oxide support comprises alumina.

20. The method of claim 18, wherein the inorganic oxide support comprises a gamma-alumina.

* * * * *